Aug. 12, 1941.  W. C. ENGEL  2,252,497
THEFT ALARM
Filed Dec. 30, 1940  2 Sheets-Sheet 1

Inventor
William C. Engel

By Clarence A. O'Brien

Attorney

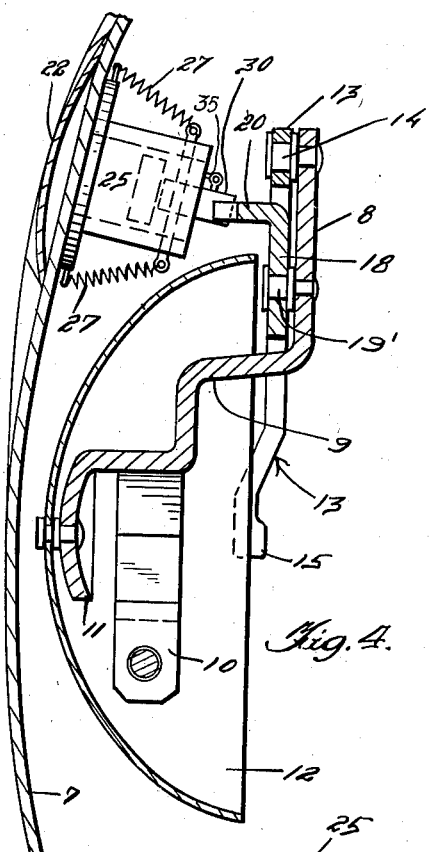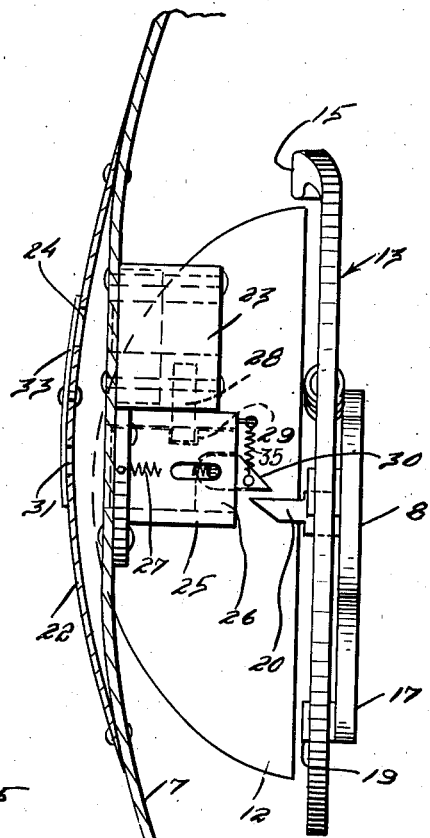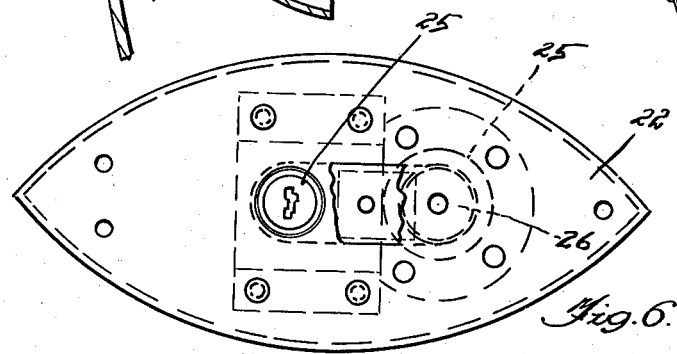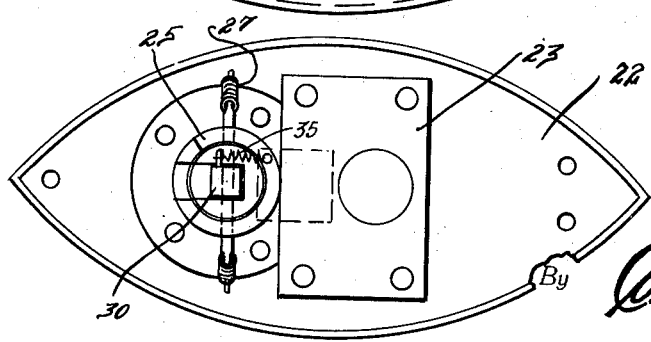

UNITED STATES PATENT OFFICE 2,252,497

THEFT ALARM

William C. Engel, Chicago, Ill.

Application December 30, 1940, Serial No. 372,405

1 Claim. (Cl. 116—33)

This invention relates to a theft alarm for automobiles, and has for the primary object the provision of a device of this character which may be easily installed on an automobile and will be practically concealed from view and protected against foreign matter and may be easily rendered operative and inoperative as desired.

Another object of this invention is the provision of a device of the above stated character which when set for operation for the purpose of giving an alarm it cannot be readily rendered inoperative by an unauthorized person and when the automobile is run or moved over the ground it will give an audible sound on each complete rotation of a wheel of said automobile so as to readily attract attention.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 4 is a vertical sectional view illustrating the construction of the present invention.

Figure 5 is a top plan view partly in section of the present invention showing the hub cap connected therewith.

Figure 6 illustrates an attaching plate for connecting a part of the present invention onto the hub cap.

Figure 7 is a rear elevation of the attaching plate.

Figures 1, 2, 3:
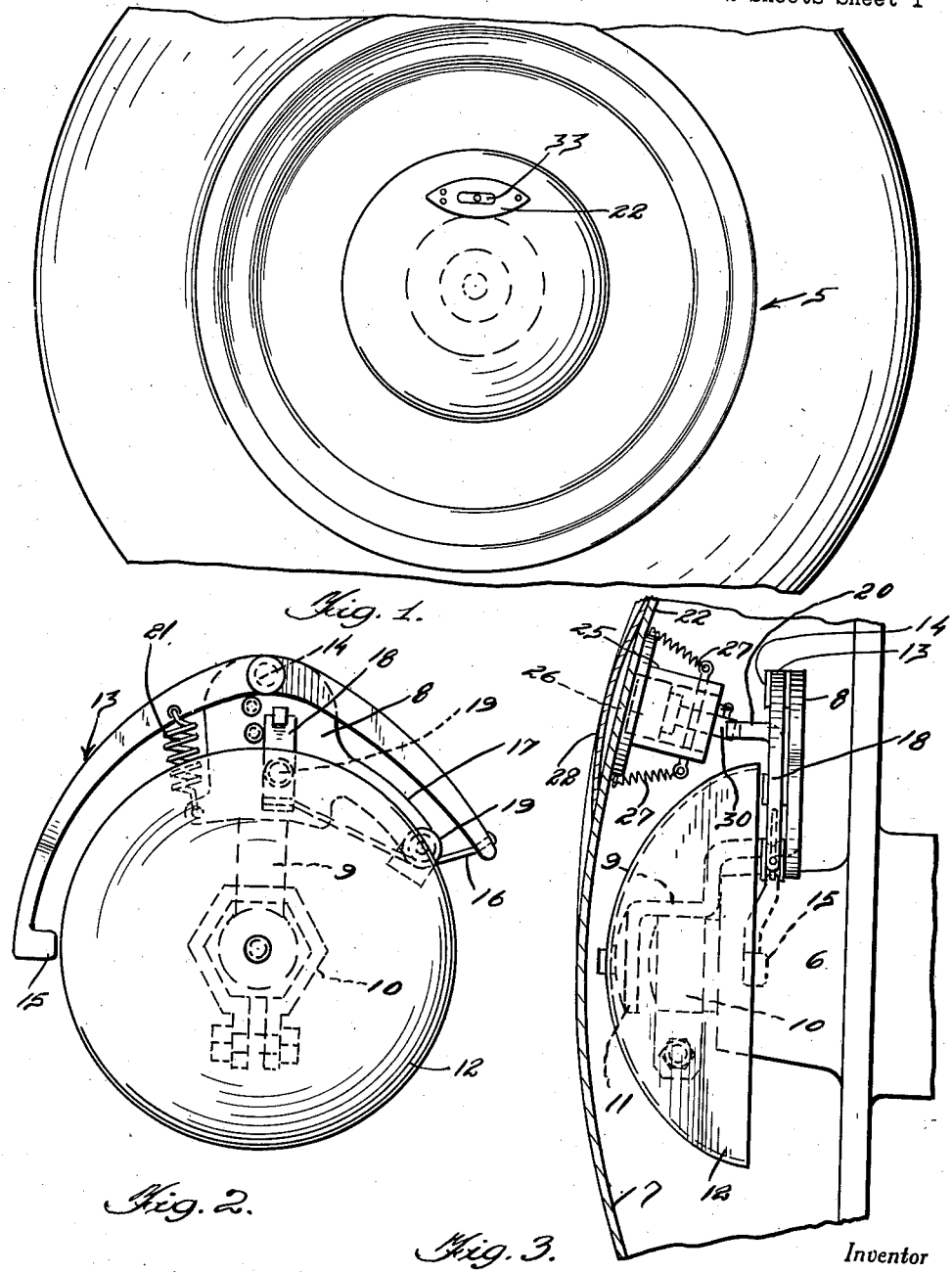
Figure 1 is a fragmentary side elevation illustrating a part of an automobile wheel to which the present invention is adapted.
Figure 2 is a front elevation illustrating the alarm.
Figure 3 is a fragmentary vertical sectional view illustrating a portion of a wheel hub and cap therefor and showing the installation of the present invention within the hub.

Referring in detail to the drawings, the numeral 5 indicates a conventional type of automobile wheel in which the hub is indicated by the character 6 and the hub cap plate by the character 7. In the conventional type of automobile wheel now in use considerable space is provided between the hub cap and the hub of the front wheel and in which may be conveniently accommodated the present invention.

A supporting plate 8 has formed thereon a depending arm 9 carrying a split clamp 10 which may be readily adapted onto the nut of the axle which supports the hub of the wheel. The depending arm 9 is provided with a plurality of stepped portions which positions the plate 8 laterally of the split clamp and in a plane above the hub. The depending arm 9 has formed thereon an attaching disc 11 positioned laterally of the split clamp and on which is mounted a gong 12.

A clapper 13 is pivotally mounted on the supporting plate 8, as shown at 14, and is in the form of an arcuately curved arm apertured to receive the pivot 14 and provided with a strike head 15 at one end thereof while the opposite end has connected thereto a flexible element 16. An arm 17 having an arcuate curvature is formed on the supporting plate 8 and supports a grooved roller 19 over which passes the flexible element 16. The other end of the flexible element is connected to one end of a pivotally mounted lever 18. The lever 18 is pivoted on the supporting plate 8, as shown at 19', and the free end thereof carries a right angularly disposed extension 20. A coil spring 21 is connected to the clapper 13 and to the supporting plate 8, the purpose of which is to draw the strike head 15 into engagement with the gong for the purpose of creating a sound. When the lever 18 is rocked in one direction a pull is made on the flexible element 16 rocking the clapper on the pivot 14 in a direction of moving the strike end 15 away from the gong and as the lever 18 is released the spring 21 acts to drive the strike end of the clapper against the gong with considerable force.

The hub cap 7 has mounted on the inner face thereof a key operated lock 23 of any suitable character. The key hole of the lock 23 is reached through an opening 24 provided in a protector plate 22 secured on the outer face of the hub cap. Also mounted on the hub cap is a sleeve 25 having slidable therein a plunger 26 spring influenced in the direction of the hub cap by a spring 27. The sleeve 25 has a slot through which a latch member 28 of the lock 23 may move to enter a notch 29 in the plunger for holding the latter in an extended position. The plunger 26 carries a spring influenced and pivotally mounted dog 30 which is adapted to lie in the path of movement of the extension 20 on the lever 18 when said plunger is extended and secured in said extended position by the lock so that on rotation of the wheel the dog will engage and impart pivotal movement to the lever 18 and ride past the extension thereof and on disengaging the extension the lever 18 is returned to initial position. As before stated, when the lever 18 receives pivotal movement in one direction it actuates the clapper 13 against the tension of the spring 21 and on the lever moving in a reverse direction or becoming disengaged from the dog 30 the spring 21 drives the head 15 of the clapper against the gong creating the audible sound. The pivotal axis of the lever 18 is eccentric to the axis of rotation of the wheel around which the dog 30 revolves, so that when the dog 30 engages the extension 20 of the lever 18 it swings said lever on its pivot and the extension 20 is caused to swing downwardly out of the path of revolution of the dog thereby permitting the dog to ratchet over the extension.

The protector plate 22 is provided with an opening 31 which aligns with an opening provided in the hub cap 7 for exposing the plunger 26 so that an instrument may be engaged therewith for moving the plunger into an extended position. To permit the plunger to move into a retracted position by the spring 27, the lock 23 must be actuated by a key inserted through the opening 24 into the lock to retract the latch member 28 from the plunger. Of course, it is to be understood that when the plunger is in a retracted position the dog 30 is out of the path of the extension 20 on the lever 18 so that the wheel may rotate without the alarm sounding.

A pivotal dust plate 33 is provided on the protector plate 22 for closing the openings 24 and 31.

The beveled end of the spring influenced pivotally mounted dog 30 and the beveled end of the extension 20 provide a coactive construction which in case the wheel rotates in a reverse direction, the clapper will not be actuated against the gong.

Part of the pivoted dog 30 is in a slot provided in the plunger when in operative position and is held against an end wall of the slot by the spring 35 to prevent said dog from pivoting when engaging the extension for the actuation of the clapper. However, if the wheel is rotated in a reverse direction and the dog engages the extension 20, the dog will pivot into the slot of the plunger so as not to operate the clapper. The beveled faces of the dog and the extension assist at this time in moving the dog into the plunger slot without danger of the dog and extension jamming.

While I have shown and described the preferred embodiment of my invention, it will be understood that minor changes in construction, combination and arrangement of parts may be made without departing from the spirit and scope of the invention as claimed.

Having thus described the invention, what I claim is:

In a theft alarm, a plate including a stepped portion, a gong mounted on the stepped portion, said plate having a portion disposed radially outwardly of the gong, an axle bracket on said stepped portion to receive and grip a non-rotating axle extending into the gong positioning the latter over one end of the axle, an arcuately curved spring influenced clapper pivoted intermediate its ends on said second mentioned portion, a lever pivoted on said plate adjacent the second mentioned portion with the pivot thereof in vertical alignment with the pivot of the clapper and having an end disposed at right angles thereto to provide an extension, a flexible element connecting the other end of the lever to one end of the clapper, a sleeve mounted on a wheel of the axle, a plunger slidable in said sleeve and having a dog slot and a keeper notch, a spring urging said plunger inwardly of the sleeve, a spring influenced dog pivoted in the dog slot and normally engaging an end wall of said slot and capable of pivoting wholly within the slot, and a key operated lock carried by the wheel to engage the keeper notch to retain the plunger in an extended position with the dog in a position to engage the extension of the lever for actuating the clapper on the rotation of the wheel in one direction.

WILLIAM C. ENGEL.